US008974645B2

(12) United States Patent
Bayer et al.

(10) Patent No.: US 8,974,645 B2
(45) Date of Patent: Mar. 10, 2015

(54) METHOD AND DEVICE FOR PLASMA REFORMATION OF FUEL FOR ENGINE APPLICATIONS

(75) Inventors: Erwin Bayer, Dachau (DE); Jürgen Steinwandel, Uhldingen-Mühlhofen (DE)

(73) Assignee: EADS Deutschland GmbH (DE)

( * ) Notice: Subject to any disclaimer, the term of this patent is extended or adjusted under 35 U.S.C. 154(b) by 816 days.

(21) Appl. No.: 12/742,982

(22) PCT Filed: Nov. 12, 2008

(86) PCT No.: PCT/DE2008/001862
§ 371 (c)(1), (2), (4) Date: Aug. 16, 2010

(87) PCT Pub. No.: WO2009/062485
PCT Pub. Date: May 22, 2009

(65) Prior Publication Data
US 2010/0294647 A1 Nov. 25, 2010

(30) Foreign Application Priority Data
Nov. 17, 2007 (DE) ......................... 10 2007 054 967

(51) Int. Cl.
*B29C 59/10* (2006.01)
*H05H 1/24* (2006.01)

(52) U.S. Cl.
CPC ....................................... *H05H 1/24* (2013.01)
USPC ........................................... 204/168; 422/186

(58) Field of Classification Search
CPC ........................................................ H05H 1/24
USPC ........................................... 204/168; 422/186
See application file for complete search history.

(56) References Cited

U.S. PATENT DOCUMENTS 4,345,527 A * 8/1982 Marchand ................. 110/104 R
5,437,250 A 8/1995 Rabinovich et al.
5,887,554 A 3/1999 Cohn et al.
5,993,761 A 11/1999 Czernichowski et al.
6,007,742 A 12/1999 Czernichowski et al.
6,245,309 B1 6/2001 Etievant et al.
6,606,855 B1 8/2003 Kong et al.
(Continued)

FOREIGN PATENT DOCUMENTS

FR 2873306 A1 1/2006
WO 9506194 A1 3/1995
WO 03023205 A1 3/2003

OTHER PUBLICATIONS

International Search Report, PCT/DE2008/001862, dated Mar. 11, 2009.

*Primary Examiner* — Xiuyu Tai
(74) *Attorney, Agent, or Firm* — Lerner, David, Littenberg, Krumholz & Mentlik, LLP

(57) ABSTRACT

The invention relates to a method for plasma reformation of fuel, in particular kerosene, which method comprises the steps of:
feeding fuel through a line to the inlet of an expansion nozzle; supplying energy from an energy source by way of a hollow waveguide to generate a plasma state in the expansion nozzle; injecting further fuel through nozzles into the arising plasma flame in order to decompose the fuel in the heat into components such as CO, C and H; and expanding the plasma flame at high speed into the combustion chamber.

7 Claims, 1 Drawing Sheet

(56) References Cited

U.S. PATENT DOCUMENTS

| | | | | |
|---|---|---|---|---|
| 2002/0151604 | A1* | 10/2002 | Detering et al. | 518/703 |
| 2003/0196611 | A1 | 10/2003 | Daniel et al. | |
| 2006/0018823 | A1 | 1/2006 | Czernichowski et al. | |
| 2007/0187372 | A1* | 8/2007 | Rabinovich et al. | 219/121.36 |
| 2008/0296294 | A1* | 12/2008 | Uhm | 219/688 |
| 2009/0272653 | A1* | 11/2009 | Beech et al. | 205/343 |

* cited by examiner

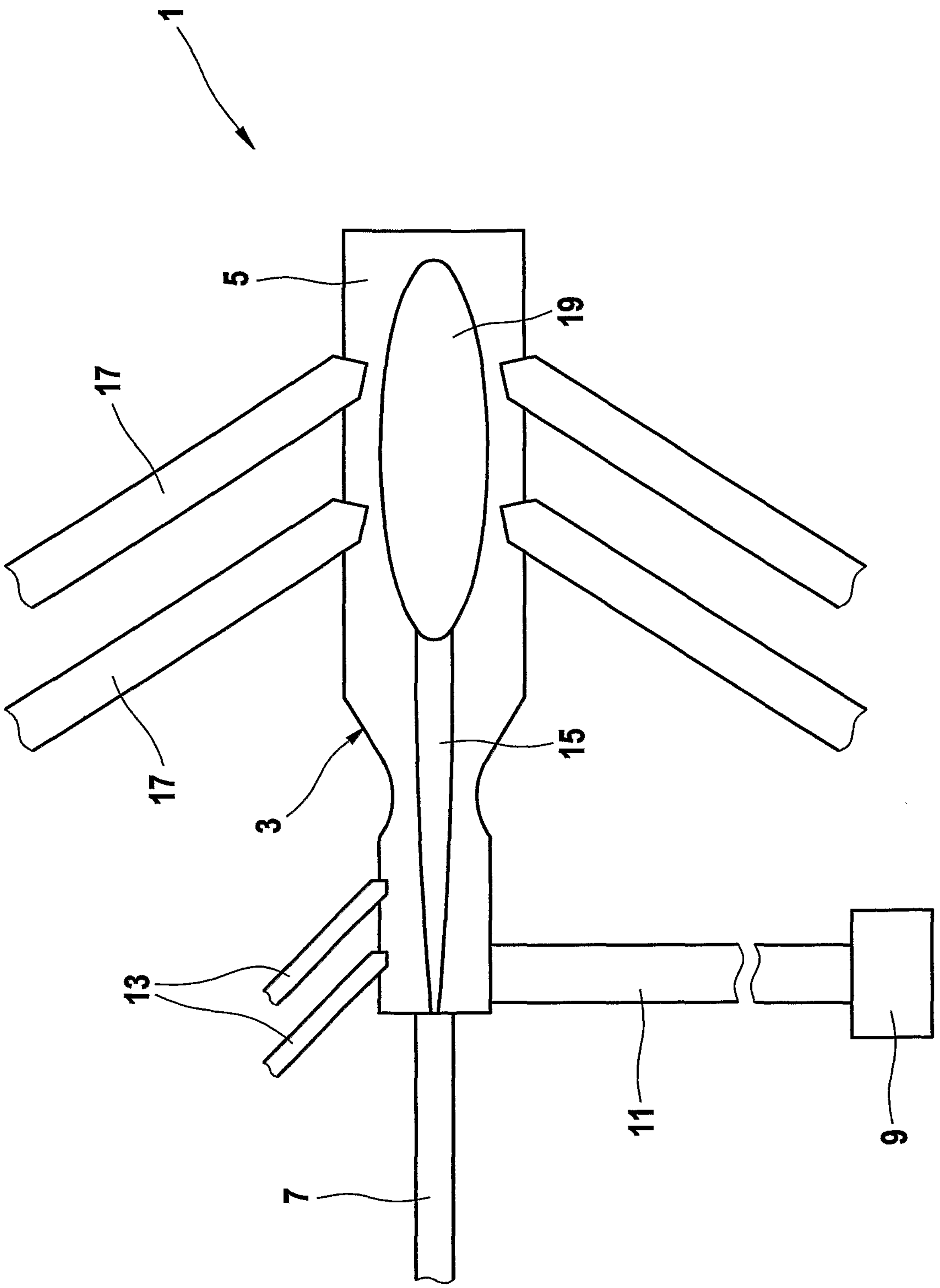
1
5
19
17
17
15
3
13
11
9
7

METHOD AND DEVICE FOR PLASMA REFORMATION OF FUEL FOR ENGINE APPLICATIONS

CROSS REFERENCE TO RELATED APPLICATIONS

The present application is a national phase entry under 35 U.S.C. §371 of International Application No. PCT/DE2008/001862, published in German, which claims the benefit of German Patent Application No. 10 2007 054 967.0, filed Nov. 17, 2007. The disclosures of said applications are incorporated by reference herein.

The present invention relates to a method and a device for plasma reformation of fuel, in particular kerosene, for engine applications.

In the reformation of hydrocarbons against the background of generating combustion gases rich in hydrogen, at present catalytic systems are used. In this process various reaction control techniques are applied, for example partial oxidation (sub-stoichiometric combustion) or steam reformation. Catalytic reformer systems are inherently comparatively large in design, which is disadvantageous in engine applications. In the engine industry, two-stage combustion comprising “hot pilot combustion” and downstream “colder main combustion” has partly won through in order to significantly reduce $NO_x$ emissions.

$NO_x$ production is in particular supported by high combustion temperatures. Attempts are thus being made to find a process which makes it possible to reduce the combustion temperature and in particular temperature peaks during combustion, while at the same time achieving as far as possible complete combustion of the fuel (also in relation to carbon particles).

It is thus the objective object of the present invention to provide a method which, while providing complete combustion of the fuel used, reduces the combustion temperature and in particular temperature peaks. Moreover, it is the object of the present invention to provide a device by means of which the present method can be implemented, with the device being sufficiently small for use in engine applications.

This objective object is met by the aspects of the present invention that are defined in the independent claims. Advantageous improvements are presented in the dependent claims.

In particular, the objective object is met in a first aspect by means of a method for plasma reformation of fuel, in particular kerosene, in which method the fuel is first, in an expansion nozzle (3), transferred to the plasma state, and subsequently further fuel is injected into the plasma in order to be decomposed, as a result of the heat, into components such as CO, C and H.

The method according to the first aspect of the present invention has the advantages that the elementary and/or low-molecular-weight components of the fuel which are generated in the plasma undergo complete combustion even at reduced temperatures of approximately 1000° C.

Furthermore, the objective object is met in a second aspect by means of a device (1) for plasma reformation of fuel, in particular kerosene, which device comprises an expansion nozzle (3) with a subsequent fuel chamber (5), wherein the expansion nozzle (3) is connected to a line (7), to a hollow waveguide (11) that connects an energy source (9), and to nozzles (13) so that in the expansion nozzle (3) a plasma flame (15) can be generated, and wherein the combustion chamber (5) is connected to air nozzles (17) so that a combustion flame (19) can be generated.

The device (1) according to the second aspect of the present invention provides advantages in that as a result of its shape similar to that of a water jet pump, the fuel in the plasma state expands at extremely high speed by way of the expansion nozzle (3) and consequently attracts the combustion air so that no pumping in the compressor of an engine occurs. Furthermore, the device is comparatively small and well suited to engine applications.

FIG. 1 shows an example of a device (1) according to the invention for plasma reformation of fuel, such as kerosene.

In the method according to the invention for plasma reformation of fuel, such as kerosene, the fuel is fed through the line (7) to the inlet of the expansion nozzle (3). By way of a hollow waveguide (11) energy is supplied from an energy source (9) in order to generate the plasma state. In this arrangement, as a result of the supply of the energy, the fuel, in particular kerosene, (at atomic level) is decomposed into its elementary and/or low-molecular components in a highly ionised manner.

Plasma reformation according to the invention preferably requires a thermal high-pressure plasma, for example an arc discharge, or advantageously a microwave plasma.

Subsequently, further fuel, in particular kerosene, is injected through nozzles (13) into the arising plasma flame (15) in order to be decomposed in the heat into components such as CO, C and H. The elementary and/or low-molecular components in the highly ionised state can also fully combust at temperatures lower than those in conventional engines, preferably at approximately 1000° C.

From the expansion nozzle (3) the plasma flame (15) is expanded at high speed into the combustion chamber (5). As a result of this high speed of the highly ionised components in the plasma flame (15) the combustion chamber (5), which follows on from the expansion nozzle (3), can be used in the manner of a water jet pump. Consequently, suction intake of the air, which is necessary for combustion, from the air nozzles (17) takes place without any additional devices for supplying air. Apart from reduced equipment-related expenditure, this also prevents any undesirable pumping in the compressor from occurring.

The combustion that takes place in the combustion chamber (5), in particular low-temperature combustion or “cold combustion”, takes place completely, even at reduced temperatures of approximately 1000° C. because the plasma state of the fuel (essentially comprising ions and radical hydrocarbon fragments) requires significantly less activation energy for combustion. Preferably, combustion takes place with an extreme excess of air.

Regarding the method according to the invention for plasma reformation of fuel, such as kerosene, as a result of the reduction of the combustion temperature to approximately 1000° C., in particular the formation of $NO_x$ is significantly reduced. According to the method of the present invention, in addition only part of the fuel is transferred by the energy from the energy source (9) to the plasma state. The remaining fuel is decomposed by the generated plasma itself into its elementary and/or low-molecular-weight components. The energy used can therefore be significantly reduced, as can the size of the energy source (9).

Regarding the device (1) according to the invention for plasma reformation of fuel, such as kerosene, as a result of the reduced equipment-related expenditure (for example the absence of pumps for the combustion air) the device of the present invention can be designed so as to be smaller. The connection of the significantly smaller energy source (9) by way of a waveguide (11) to the expansion nozzle (3) provides a further advantage. The use of the waveguide (11) makes a decentralised arrangement of the energy source (9) possible. As a result of these equipment-related advantages the device (1) according to the invention can easily be used in engine applications.

Although the present invention was described with reference to a method and a device for plasma reformation of kerosene in engine applications, it is possible to use propellants and fuels that are known to the person skilled in the art and that are equivalent to kerosene. Furthermore, the method and the device need not be confined to engine applications, but can instead be arranged upstream of various types of turbines, combustion engines or fuel cells.

The invention claimed is:

1. A method for plasma reformation of fuel, in particular kerosene, which method comprises the steps of:

feeding fuel through a line to an inlet of an expansion nozzle, supplying energy from an energy source, by way of a hollow waveguide, in order to generate a plasma flame in the expansion nozzle, injecting further fuel through fuel nozzles into the arising plasma flame in the expansion nozzle in order to decompose the injected fuel into components selected from the group consisting of CO, C and H, by the plasma flame, and expanding the plasma flame at high speed into a combustion chamber, wherein as a result of the expansion of the plasma flame at high speed into the combustion chamber, suction intake of air necessary for combustion from air nozzles into the combustion chamber takes place.

2. The method according to claim 1, wherein said energy is a high-pressure plasma source for generating said plasma flame.

3. The method according to claim 1, wherein the suction intake of the air necessary for combustion takes place without additional devices.

4. The method according to claim 1, wherein combustion in the combustion chamber takes place with an extreme excess of air.

5. The method according to claim 1, wherein the combustion temperature is at approximately 1000° C.

6. The method according to claim 2, wherein said thermal high-pressure plasma is an arc discharge or a microwave plasma.

7. The method of claim 1, wherein said fuel fed through said line and said further injected fuel are both kerosene.

* * * * *